United States Patent
Blagodurov et al.

(10) Patent No.: US 10,761,986 B2
(45) Date of Patent: Sep. 1, 2020

(54) REDIRECTING DATA TO IMPROVE PAGE LOCALITY IN A SCALABLE DATA FABRIC

(71) Applicant: Advanced Micro Devices, Inc., Santa Clara, CA (US)

(72) Inventors: Sergey Blagodurov, Bellevue, WA (US); Timothy E. Landreth, Hopkinton, MA (US); Stanley Ames Lackey, Jr., Leominster, MA (US); Patrick Conway, Los Altos, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/168,315

(22) Filed: Oct. 23, 2018

(65) Prior Publication Data
US 2020/0125490 A1    Apr. 23, 2020

(51) Int. Cl.
*G06F 12/0815*    (2016.01)
*G06F 3/06*    (2006.01)

(52) U.S. Cl.
CPC ........ *G06F 12/0815* (2013.01); *G06F 3/0613* (2013.01); *G06F 3/0629* (2013.01); *G06F 3/0671* (2013.01)

(58) Field of Classification Search
CPC .. G06F 12/0815; G06F 3/0613; G06F 3/0671; G06F 3/0629
See application file for complete search history.

(56) References Cited

U.S. PATENT DOCUMENTS

| | | | |
|---|---|---|---|
| 7,096,323 B1 | 8/2006 | Conway et al. | |
| 7,155,572 B2 | 12/2006 | Hughes et al. | |
| 7,334,102 B1 | 2/2008 | Conway | |
| 2005/0081015 A1* | 4/2005 | Barry | G06F 9/30174 712/1 |
| 2007/0038840 A1* | 2/2007 | Hummel | G06F 12/1027 711/207 |
| 2009/0328074 A1* | 12/2009 | Oshins | G06F 9/45537 719/321 |
| 2010/0005248 A1* | 1/2010 | Cheng | G06F 12/082 711/146 |
| 2011/0161620 A1* | 6/2011 | Kaminski | G06F 12/1009 711/207 |
| 2015/0032964 A1* | 1/2015 | Habermann | G06F 12/0811 711/122 |

(Continued)

OTHER PUBLICATIONS

Gen-Z Consortium; "DRAM and Storage-Class Memory (SCM) Overview"; white paper, 2016; 7 pages.

(Continued)

*Primary Examiner* — Idriss N Alrobaye
*Assistant Examiner* — Ronald T Modo
(74) *Attorney, Agent, or Firm* — Polansky & Associates, P.L.L.C.; Paul J. Polansky; Rosalynn M. Smith (57) ABSTRACT

A data processing system includes a host processor, a local memory coupled to the host processor, a plurality of remote memory media, and a scalable data fabric coupled to the host processor and to the plurality of remote memory media. The scalable data fabric includes a filter for storing information indicating a location of data that is stored by the data processing system. The host processor includes a hardware sequencer coupled to the filter for selectively moving data stored by the filter to the local memory.

28 Claims, 5 Drawing Sheets

(56) References Cited

U.S. PATENT DOCUMENTS

2018/0232310 A1* 8/2018 Chang ................ G06F 12/0246

OTHER PUBLICATIONS

"AMD 64-Bit Technology, AMD x86-64 Architecture, Programmer's Manual vol. 2: System Programming"; white paper; Pub. No. 24593; Rev. 3.07; Sep. 2002; Advanced Micro Devices, Inc., 2485 Augustine Drive, Santa Clara, CA 95054; 71 pages.

* cited by examiner

| Bit | Entry Description | Default |
|---|---|---|
| 6 | MOST RECENTLY USED PPF/DMAF ENTRY IN SET | 1 (set) |
| 5 | N-1 MOST RECENTLY USED PPF/DMAF ENTRIES IN A SET | 1 |
| 4 | ENTRIES FOR DIRTY GenZ PAGES | 1 |
| 3 | ENTRIES FOR CLEAN GenZ PAGES | 1 |
| 2 | ENTRIES FOR DIRTY SCM PAGES | 1 |
| 1 | ENTRIES FOR CLEAN SCM PAGES | 1 |
| 0 | INVALID PPF ENTRIES | 0 |

REDIRECTING DATA TO IMPROVE PAGE LOCALITY IN A SCALABLE DATA FABRIC

STATEMENT REGARDING FEDERALLY SPONSORED RESEARCH OR DEVELOPMENT

This invention was made with United States government support under the PathForward Project with Lawrence Livermore National Security (Prime Contract No. DE-AC52-07NA27344, Subcontract No. B620717) awarded by the Department of Energy (DOE). The United States government has certain rights in this invention.

BACKGROUND

Memory controllers are circuits that translate accesses generated by a memory accessing agent such as a data processor into one or more commands that are understood by computer memory. A memory controller can be implemented as a separate chip or integrated with other components such as data processors on a single integrated circuit chip. In the latter case, the memory controller is usually called an integrated memory controller. Typical integrated memory controllers support the double data rate dynamic random-access memory (DDR DRAM) bus protocol, but support only pre-existing DDR DRAM devices or devices that operate like them. The need for tight coupling of memory with computing resources like central processing units (CPUs), graphics processing units (GPUs), digital signal processors (DPSs), and the like pose challenges to the system designer related to memory capacity requirements, memory controller availability, memory lifecycle limitations, and memory bandwidth availability to CPUs. Capabilities such as in-memory workloads and server virtualization drive the need for increasing memory capacity. Moreover, the increasing performance of CPUs creates a need for more memory channels per socket. For example, memory capacity requirements are driven by the number of CPUs in order to maintain balanced computational resources for many workloads. Furthermore, lifecycles of memory generations are limited, requiring memory controller redesign when new memory generations are introduced.

In an effort to address these evolving needs, designers have developed new types of memory and memory systems. For example, one new type of memory known as storage class memory (SCM) uses dual inline memory modules (DIMMs) similar to standard DDR DRAM, but uses NAND Flash as a backing store and DRAM as a local cache for active data. One new type of memory system, known as GenZ, uses a standard interface protocol between processors and media in a communication fabric to support both directly attached memory and multiple levels of fabric attached memory of different types.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well. Additionally, the terms remap and migrate, and variations thereof, are utilized interchangeably as a descriptive term for relocating.

DETAILED DESCRIPTION OF ILLUSTRATIVE EMBODIMENTS

As will be described below in one form, a data processing system includes a host processor, a local memory coupled to the host processor, a plurality of remote memory media, and a scalable data fabric coupled to the host processor and to the plurality of remote memory media. The scalable data fabric includes a filter for storing information indicating a location of data that is stored by the data processing system. The host processor includes a hardware sequencer coupled to the filter for selectively moving data stored by the filter to the local memory.

In another form, a data processing unit includes a hardware sequencer and a scalable data fabric coupled to the hardware sequencer. The scalable data fabric includes a coherent slave module and an input/output memory slave module. The coherent slave module has a first filter for receiving a location of data cached by a remote memory accessing agent and providing the location of the data to the hardware sequencer based on at least one characteristic of the data. The input/output memory slave module has a second filter coupled to the hardware sequencer for receiving the location of the data by a remote memory accessing agent and storing select content of the data to determine which data to provide to the hardware sequencer.

In still another form a method for selecting memory access requests includes receiving, at a scalable data fabric, information associated with a memory access request from a memory media device. The information associated with the memory access requests is tracked by a filter based on at least one characteristic of the memory access requests from among a plurality of characteristics. Which information associated with the memory access requests is tracked by the filter is determined to write to memory based on the at least one characteristic. In response to the determining, the information associated with the memory access requests is stored in a local memory using a hardware sequencer. Migration of the information associated with the memory access requests is selectively scheduled from the filter to the local memory.

Figure 1:
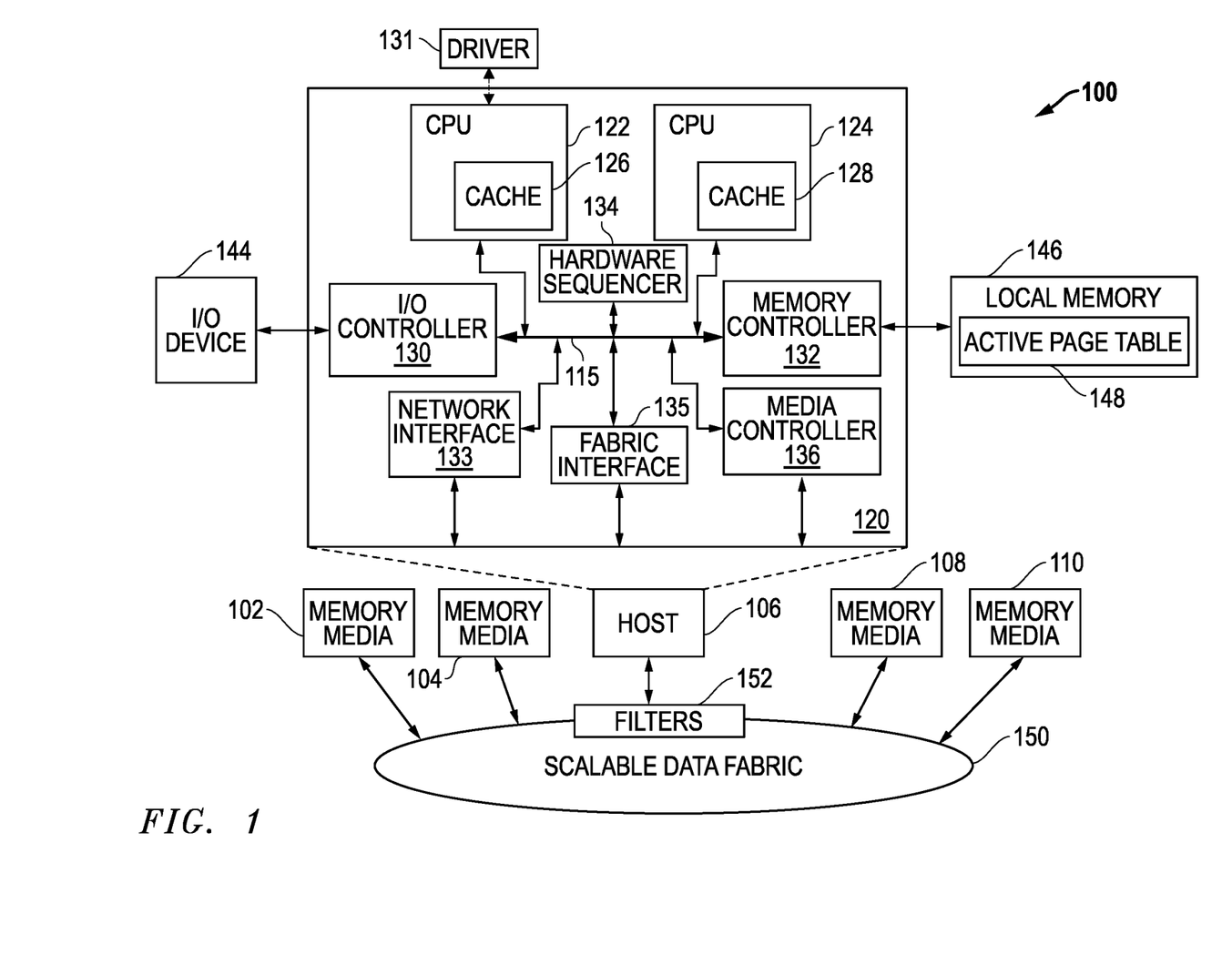
FIG. 1 illustrates in block diagram form a data processing system according to some embodiments.

FIG. 1 illustrates in block diagram form a data processing system 100 according to some embodiments. Data processing system 100 includes a host 106 and memory media 102, 104, 108, and 110 connected together by a scalable data fabric 150. Host 106 includes a host processor 120 having two central processing unit (CPU) cores 122 and 124 with associated caches 126 and 128, respectively, an input/output (I/O) controller 130, a driver 131, a memory controller 132, a network interface 133, a hardware sequencer 134, a fabric interface 135, and a media controller 136. I/O controller 130 connects an associated I/O device 144 to host processor 120. In the illustrated example, I/O controller 130 implements a non-coherent form of the HyperTransport protocol to receive and store data that is not cached in data processing system 100. Network interface 133 is connected to a system interconnect 115 and implements a coherent form of the HyperTransport protocol. Memory controller 132 is connected to a local memory 146. In the illustrated embodiment, local memory 146 is implemented with DRAM.

System interconnect 115 connects CPU cores 122 and 124, I/O controller 130, memory controller 132, network interface 133, hardware sequencer 134, fabric interface 135, and media controller 136. In this example, host processor 120 includes two CPU cores 122 and 124, but in other embodiments, host processor 120 can include an arbitrary number of CPU cores. Each of caches 126 and 128 is bidirectionally connected to system interconnect 115 and is capable of providing memory access requests such as cache line fills, writebacks, and probe requests and responses to scalable data fabric 150 via memory controller 132 and fabric interface 135. Each of CPU cores 122 and 124 may be a unitary core or may further be a core complex with two or more unitary cores sharing certain resources such as caches 126 and 128. System interconnect 115 includes a crossbar switch for routing memory access requests and memory responses between any memory accessing agent and memory controller 132. System interconnect 115 also maintains a system memory map for determining destinations of memory accesses based on the system configuration, as well as various transaction buffers.

Memory media 102, 104, 108, and 110 are remote data storage agents that provide access to data in external memory pools via scalable data fabric 150 which is shared between multiple compute agents such as CPUs 122 and 124.

Driver 131 is, for example, a module of an operating system (OS) kernel that makes page placement decisions based on information about memory access patterns. For example, driver 131 relocates the pages most frequently accessed by host processor 120 from other pools in scalable data fabric 150 to local memory 146.

Memory controller 132 is the mechanism for data transfer between host processor 120 and all memory in the system, including local memory 146 and memory media 102, 104, 108, and 110. Memory controller 132 is connected to and receives memory access requests from memory accessing agents over system interconnect 115. Memory controller 132 offloads the task of initiating and terminating memory accesses from CPU cores 122 and 124. Memory controller 132 also includes a media controller for local memory 146 having internal queues to allow efficient use of the external bus to local memory 146. In the illustrated embodiment, local memory 146 is implemented using DRAM, but could be implemented by other types of memory besides DRAM, such as static RAM, nonvolatile memory, etc.

Hardware sequencer 134 is a circuit that periodically scans filters 152 and writes selected contents to an area of local memory 146 referred to as an active page table 148.

I/O device 144 is an input/output device that functions as a producer of non-cacheable data. In the example shown in FIG. 1, I/O device 144 complies with the non-coherent form of the HyperTransport™ I/O Link Specification, Revision 1.03, © 2001 HyperTransport Technology Consortium.

Local memory 146 is connected to host processor 120 through memory controller 132. In other embodiments, local memory 146 can be implemented with other forms of memory such as high band width memory (HBM), phase-change memory (PCM), and other similar types of page-oriented memory. Local memory 146 includes active page table 148 that stores information locally to host processor 120 to help driver 131 make page migration decisions.

Scalable data fabric 150 is a hierarchical interconnect that provides data transfer between low-latency memory pools, such as memory media 102, 104, 108, and 110 and host processor 120. Scalable data fabric 150 utilizes a packet-based protocol, such as the coherent HyperTransport (cHT) protocol, to provide a latency-insensitive load-store interface between processing elements and memory modules. Scalable data fabric 150 is scalable per component and the components do not have to be directly attached to host processor 120. Instead the components can be connected via switched or scalable data fabric topologies with gateways to other networks (e.g. Ethernet and InfiniBand networks). Scalable data fabric 150 also facilitates the use of higher latency non-volatile random-access memory (NVRAM) and other memory types. In these memories, the write latency tends to be larger than the read latency. In one embodiment, scalable data fabric 150 implements a protocol developed by the GenZ Consortium. However scalable data fabric 150 could implement any other similar protocol.

Scalable data fabric 150 includes a set of one or more filters 152. In the exemplary embodiment that will be described further below, filters 152 include one filter that stores information indicating locations of data elements that are cached anywhere in the system, and another filter that tracks non-cacheable memory accesses.

In the illustrated embodiment, driver 131 runs on CPU 122 and performs two functions useful for operating in data processing system 100. First, it programs hardware sequencer 134 to read selected fields of filters 152 and store them in active page table 148. Second, it periodically scans active page table 148 to determine which pages being accessed by CPU cores 122 and 124 are currently stored in a slower or more remote memory, e.g. one of memory media 102, 104, 108, and 110, and utilizes a system call known as "movepage" to migrate selected pages to local memory 146. Thus, driver 131 in conjunction with hardware sequencer 134 efficiently and opportunistically moves data to improve the locality of data placement in a system with a complex, scalable data fabric.

Figure 2:
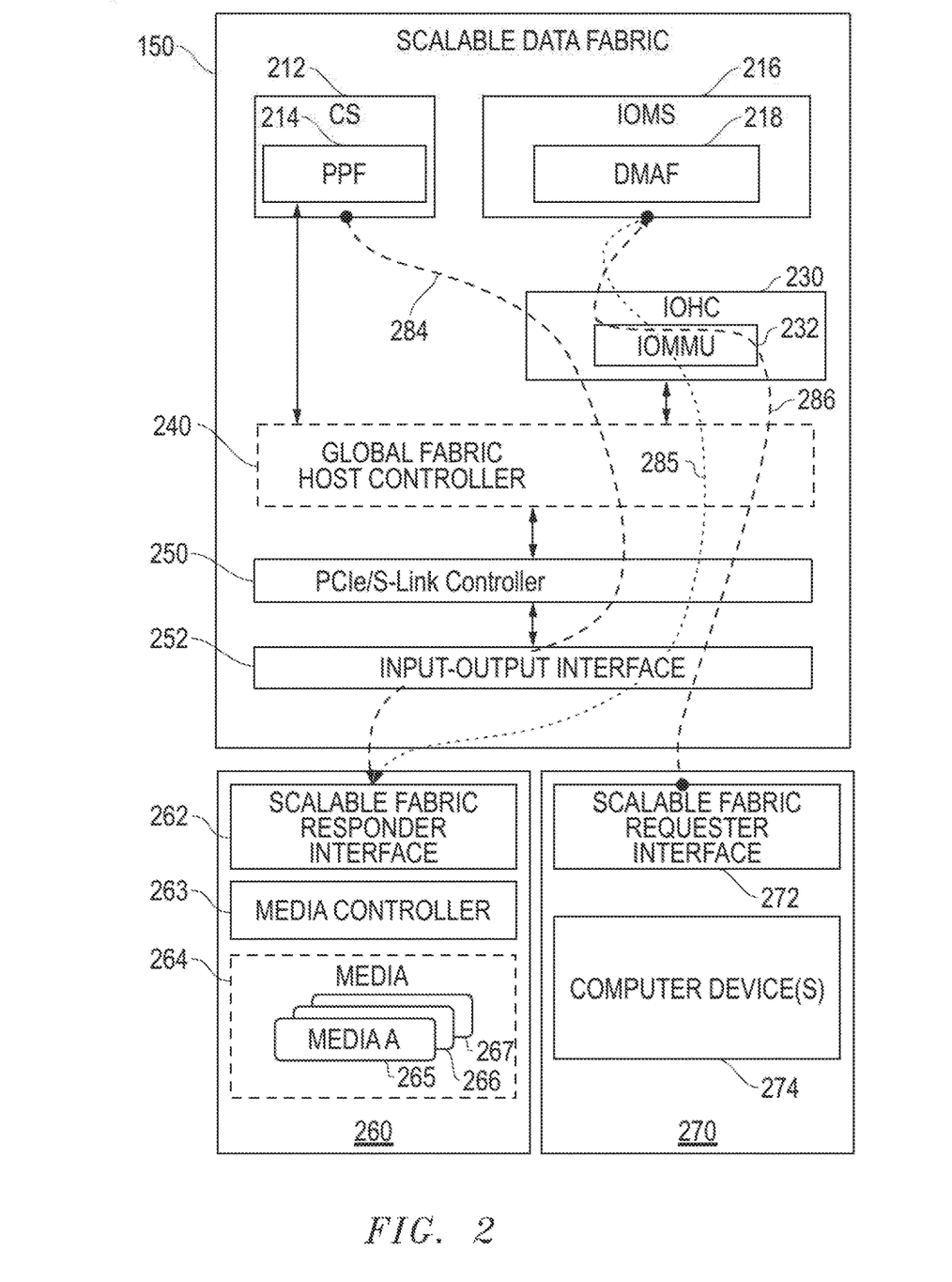
FIG. 2 illustrates in block diagram form an extended scalable fabric system for use in the data processing system of FIG. 1 according to some embodiments.

FIG. 2 illustrates in block diagram form an extended scalable fabric system 200 for use in data processing system 100 of FIG. 1 according to some embodiments. Extended scalable fabric system 200 includes generally scalable data fabric 150, a responder network 260, and a requester network 270 including host processor 120 (not specifically shown in FIG. 2).

Scalable data fabric 150 includes generally a coherent slave (CS) 212, an input/output master/slave (IOMS) 216, an input/output host controller (IOHC) 230, a global fabric host controller 240, a Peripheral Component Interconnect express (PCIe)/S-link controller 250, and an input/output interface 252. CS 212 manages coherence for all the physical memory associated with scalable data fabric 150. CS 212 acts as a scalable ordering point for memory access and guarantees scalable visibility for memory accessing agents associated with extended scalable fabric system 200. Further, CS 212 enables address serialization and launches probes for coherence purposes. CS 212 is responsible for maintaining ordering and coherency for received memory access requests. CS 212 implements a cache coherency protocol, such as coherent HyperTransport (cHT). CS 212 interfaces with memory controller 132 through a socket direct protocol (SDP) port. CS 212 includes a page probe filter (PPF) 214 that is a hardware filter circuit that enables a global view of all recently accessed pages. In particular, PPF 214 includes a list of all pages which are actively cached anywhere in data processing system 100. PPF 214 tracks the memory corresponding to the DRAM addresses owned by the memory channel associated with CS 212. To facilitate page movement decisions, PPF 214 exposes selected information from its tag and data arrays, directly or indirectly, to driver 131 of the operating system.

IOMS 216 is a module that serves accesses to memory associated with scalable data fabric 150 and is also an entry point of all direct memory access (DMA) (non-cacheable) memory requests from scalable data fabric 150 to host processor 120. IOMS 216 includes a DMA filter (DMAF) 218 that, like PPF 214, is a hardware filter circuit. IOMS 216 contains both master and slave functionality and hence has two SDP ports: (i) a master SDP for DMA accesses from an I/O device, and (ii) a slave SDP for downstream accesses from host processor 120 to a media memory device. DMAF 218 tracks memory accesses going through IOMS 216 via the two SDP ports. To facilitate data movement decisions, DMAF 218 exposes this information, directly or indirectly, to driver 131 of the operating system.

Hardware sequencer 134 periodically scans the arrays of PPF 214 and DMAF 218 and writes selected contents to active page table 148 in local memory 146. Driver 131 in turn periodically scans active page table 148 to determine what pages are candidates for data movement. For example, data movement candidates could be data currently cached in slow non-volatile RAM (NVRAM) or memory in scalable fabric system 200. Hardware sequencer 134 utilizes a predetermined system call, e.g. the "movepage" system call, to migrate the pages to local memory 146. Hardware sequencer 134 also includes control registers to determine which content from PPF 214 and DMAF 218 to write to active page table 148.

IOHC 230 includes an input/output memory management unit (IOMMU) 232 to translate local memory addresses into corresponding system addresses.

Global fabric host controller 240 is connected to both CS 212 and IOMS 216 (through IOHC 230) and has a port for receiving requests from and providing responses to fabric-attached requestors. Global fabric host controller 240 may include a separate address translation mechanism and performs link control using link-defined protocols, such as the GenZ protocol.

PCIe/S-link controller 250 performs lower-level communication between the components in extended scalable data fabric 200 using the packet-based protocol known as the "PCI Express" (PCIe) protocol defined by the PCI Special Interest Group. In an alternative embodiment, PCIe/S-link controller 250 could implement any other similar link protocol that is capable of operating between components connected in a hierarchy.

Input/output interface 252 provides buffering and physical interfaces between components in scalable data fabric 150 and requestors and responders connected to it.

In one embodiment, the components of scalable data fabric 150 are combined in one integrated circuit (IC) and the components of host processor 120 in another IC. In an alternate embodiment, all of these circuits are combined in a single IC.

Responder network 260 includes, generally, a scalable fabric responder interface 262, a media controller 263, and a media group 264. Scalable fabric responder interface 262 communicatively connects to scalable data fabric 150 and enables access to remote memory pools such as media groups 264. Media controller 263 provides an interface to particular types of media, such as DRAM, NVRAM, Flash memory, and the like. Media group 264 includes a set of remote memory media 265-267. Each of remote memory media 265-267 can include, for instance, a computing device at a location remote to host processor 120. Responder network 260 provides data to and receives data from remote memory media 265-267 via scalable data fabric 150.

Requester network 270 includes a scalable fabric requester interface 272, and one or more compute devices 274, such as host processor 120 of FIG. 1. Each compute device 274 is a memory accessing agent that provides requests to scalable data fabric 150.

Extended scalable data fabric system 200 improves efficiency of data placement in data processing system 100 by making information stored in PPF 214 and DMAF 218 visible to the operating system. Thus the operating system can make opportunistic page migration decisions and thereby dynamically improve the locality of data accesses. Hardware sequencer 134 automatically moves selected information from the filters in scalable data fabric 150 to local memory 146 where it can be easily analyzed by the operating system.

PPF 214 stores a list of pages cached in the system and exposes this data to the operating system through hardware sequencer 134. DMAF 218 contains data regarding non-cacheable pages that pass through IOMS 216 and exposes this data to the operating system through hardware sequencer 134 as well. Hardware sequencer 134 retrieves selected information from PPF 214 and DMAF 218 and provides the information to a memory area that is easily accessible by driver 131, namely active page table 148. PPF 214 and DMAF 218 track the location of data in local memory 146 and remote memory media 264, and provide to hardware sequencer 134 selected location information for one of a first type of data (coherent) and a second type data (non-coherent). Hardware sequencer 134 only accesses selected data that is useful to driver 131. For example, the data memory access requests that miss in the cache are useful for accessing memory during the process of memory migration. Hardware sequencer 134 accesses information stored by PPF 214 and DMAF 218 that would be useful to driver 131 to make page migration decisions. For this reason, PPF 214 and DMAF 218 prefilter and preprocess the data that is exposed to driver 131. Hardware sequencer 134 allocates a region of local memory 146 to store the pre-processed and pre-filtered portion of data. Hardware sequencer 134 periodically scans PPF 214 and DMAF 218, and in response to scanning PPF 214 and DMAF 218 writes a selection of content from PPF 214 and DMAF 218 to local memory 146, and asserts an interrupt via a message signaled interrupt write command. The message signaled interrupt write command informs driver 131 that the portion of data is ready for migration. Hardware sequencer 134 includes a set of control registers that determine which of the selection of content from the memory access request to write to local memory 146. For example, hardware sequencer 134 updates a bit of a respective control register 226 when a corresponding entry field receives information associated with the memory access requests.

In one example of data flow, an access to media memory 265 is received at scalable data fabric 150. Line 284 illustrates a path of the access from CS 212 to media memory 265. PPF 214 stores information indicating a location of the data that is cached by the data processing system. The information associated with the data can be stored in the form of a data array. Alternatively, line 285 illustrates a request to migrate uncacheable data to media memory 265. DMAF 218 stores information indicating a location of the data that is not cached by the data processing system. In another embodiment, line 286 represents a path in which scalable data fabric 150 receives a memory access request from a compute device 274. The path of migration provides the information associated with the data to IOMS 216 via IOMMU 332. PPF 214 and DMAF 218 can each store the information that characterizes the data in a combined data array or separate data arrays.

Hardware sequencer 134 periodically harvests useful data from PPF 214 and DMAF 218 to make it easy for driver 131 to make page migration decisions, advantageously performing repetitive, routine tasks in hardware circuitry without requiring operating system intervention.

Figure 3:
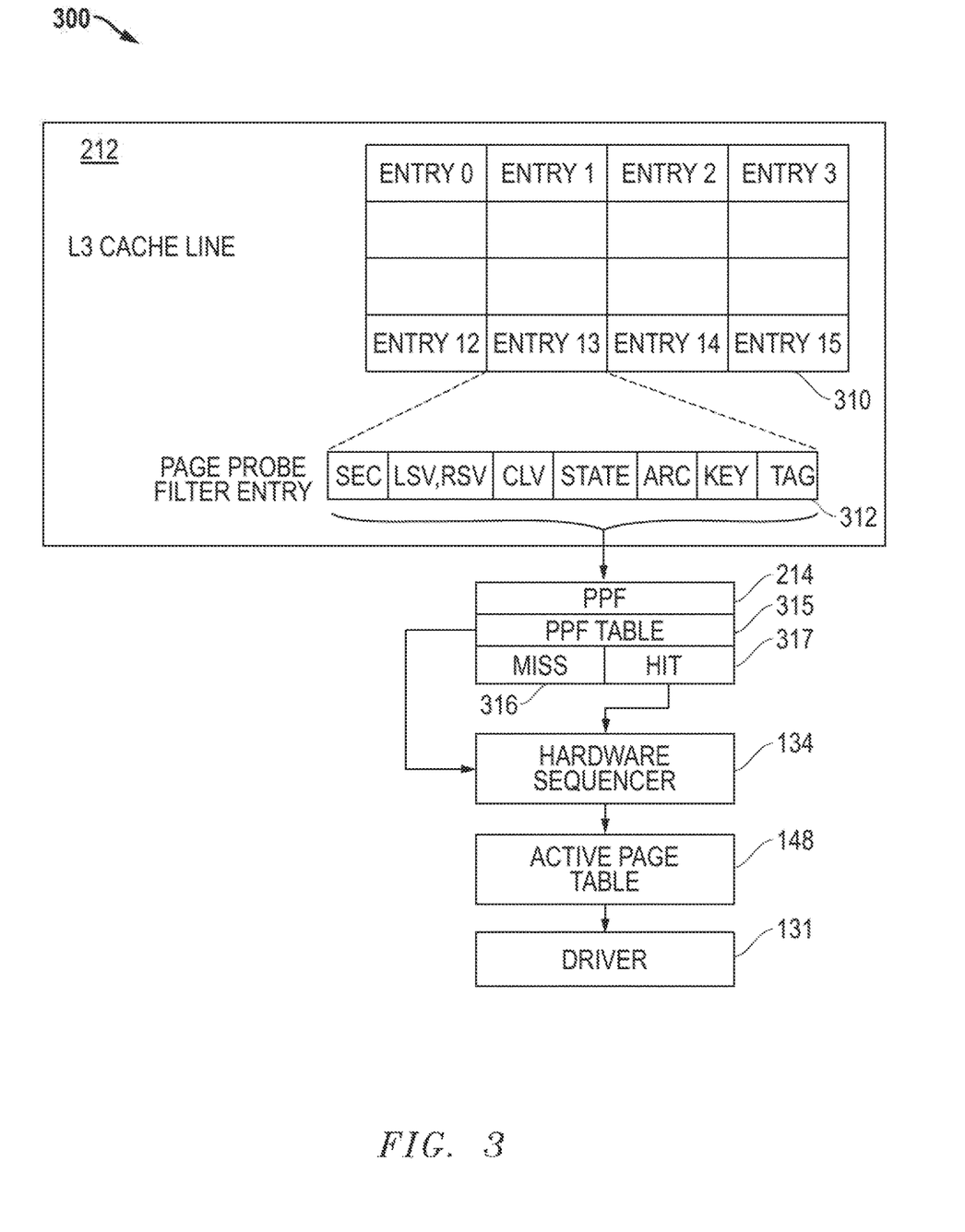
FIG. 3 illustrates in block diagram form a coherent slave (CS) portion of the extended scalable fabric system of FIG. 2.

FIG. 3 illustrates in block diagram form a coherent slave (CS) portion 300 of extended scalable fabric system 200 of FIG. 2. In general, CS portion 300 includes CS 212, page probe filter 214, hardware sequencer 134, active page table 148, and driver 131. CS 212 monitors probe traffic generated to maintain cache coherency in extended scalable fabric system 200 according to a particular cache coherency protocol, such as coherent HyperTransport (cHT). For example, the probe traffic could be related to data stored in a level three (L3) cache 310.

PPF 214 includes an exemplary PPF entry 312 with information useful in making page migration decisions. In the disclosed embodiment, coherent slave portion 300 tracks memory locations that are cached anywhere in data processing system 100. The memory locations can be stored in an entry of an array of PPF 214. PPF 214 stores a list (or table) having entries associated with recently accessed memory pages in a PPF table 315.

In the embodiment illustrated in FIG. 3, PPF entry 312 stores the following information: a SEC (sector valid) bit; LSV (local socket valid) and RSV (remote socket valid) bits; CLV (cluster valid) bits; STATE bits; ARC (aggregate reference count) bits; KEY (encryption key) bits; and TAG (address tag) bits. In an example with 2 kilobyte (2 KB) pages, each 2 KB page is split into 4 sectors of 8 cache lines each. The respective Sector Valid bit is set when any of the 8 lines in the sector is touched, indicating at least one 64B cache line of a 512B sector is valid in a cache. Once both the RSV and LSV bits are set, it is assumed that, for every CLV bit that is set, the line may be present in both local and remote sockets, i.e. the page is present in the associated cluster of either socket. The STATE bits indicate one of five tracked states: I=Invalid, CE=Clean Exclusive, CS=Clean Shared, DE=Dirty Exclusive, and DS=Dirty Shared). The ARC field tracks a count of cached copies of the 32B cache lines within a 2 KB page in cache complexes (CCXs). The ARC is kept accurate to provide the ability to reclaim the entry when ARC drops to 0. KEY is an optional encryption key used in some protocols. The TAG field indicates the address of the page that the entry corresponds to. In one example, PPF 214 supports up to 1 terabyte (TB) of memory, requiring 40 address bits, with 16K indexes (14 bits) and 29-bit page addresses, in which case the TAG is 15 bits.

Driver 131 is responsive to patterns of page probes stored in active page table 148 to selectively move the data to a memory location that is identified by driver 131. Hardware sequencer 134 periodically scans PPF 214, and in response to scanning PPF 214 writes selected content from PPF 214 to active page table 148. Driver 131 runs on host processor 120 and accesses active page table 148 to selectively make data movement decisions based on data in the active page table 148.

In this way PPF 214 stores information indicating a location of data that is cached by extended scalable data fabric 200. Hardware sequencer 134 selectively moves data from PPF 214 to active page table 148 to make it visible to the operating system and to allow driver 131 to efficiently make page placement decisions, and thereby improve the locality of data regardless of the diversity of the memory resources.

Figure 4:
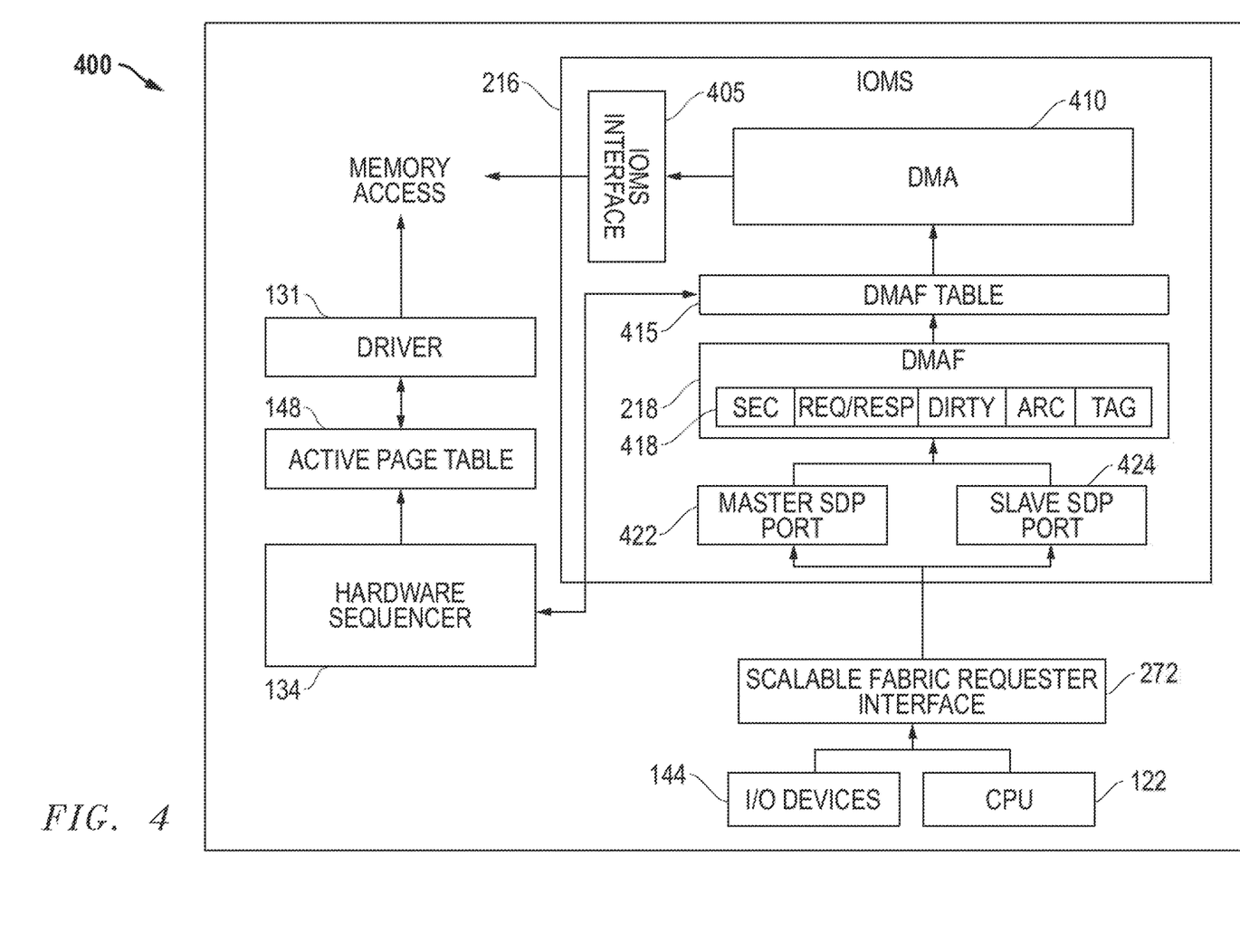
FIG. 4 illustrates in block diagram form an input/output master/slave (IOMS) portion of the extended scalable fabric system of FIG. 2.

FIG. 4 illustrates in block diagram form an input/output master/slave (IOMS) portion 400 of extended scalable fabric system 200 of FIG. 2. IOMS portion 400 includes IOMS 216, hardware sequencer 134, active page table 148, driver 131, a scalable fabric requester interface 272, I/O device 144, and CPU core 122. IOMS 216 has a bidirectional connection to hardware sequencer 134 and an output to memory. Hardware sequencer 134 has a bidirectional connection to IOMS 216, and an output. Active page table 148 has an input connected to the output of hardware sequencer 134, and bidirectional interface to driver 131. Driver 131 is illustrated as having an output to memory, which it accomplishes through instructions executed by CPU core 122. I/O device 144 and CPU core 122 each have a respective output to scalable fabric requester interface 272. Global fabric requester interface 272 has an output to IOMS 216.

IOMS 216 includes an IOMS interface 405, a DMA controller 410, a DMAF table 415, DMAF 218, a Master SDP port 422, and a slave SDP port 424. IOMS interface 405 has an input from DMA controller 410, and an output. DMA filter table 415 includes a bidirectional connection to hardware sequencer 134, an input from DMAF 218, and an output. DMA filter 218 has an input from master SDP port 422 and slave SDP port 424, and an output. Master SDP port 422 and slave SDP port 424 each include an input from global fabric requester interface 272. Global fabric requester interface 272 receives respective inputs from I/O device 144 and CPU core 122.

In operation, IOMS portion 400 tracks and makes data movement decisions for non-cacheable accesses in extended scalable data fabric 200, such as I/O accesses that typically use DMA to move data between the I/O device such as I/O device 144 and memory. DMAF 218 tracks the accesses going through TOMS 216, including both master SDP port 422 and slave SDP port 424. DMAF 218 tracks relevant information associated with the memory access requests, and catalogs selected content of the data based on at least one characteristic of the memory access requests from among a plurality of characteristics. DMAF 218 includes a set of entries including a representative entry 418 to organize the information associated with the noncacheable data.

In the embodiment illustrated in FIG. 4, DMAF entry 418 stores the following information: a SEC (sector valid) bit; a REQ/RESP field; a DIRTY bit; an ARC (aggregate reference count) field; and TAG (address tag) bits. In the same example of 2 KB pages, each 2 KB page is split into 4 sectors of 8 cache lines each. The respective sector valid bit is set when any of the 8 lines in the sector is touched, i.e. when at least one DMA request (64B) to a 512B sector has gone through the given port of IOMS 216. REQ/RESP tracks whether there were any DMA accesses to the page from a scalable fabric requestor, i.e. a compute device separate from host 106 behind the Gen-Z fabric. If the REQ/RESP field is 0, then all accesses to the page are assumed to be from host 106. The DIRTY bit tracks whether there was at least one write issued to the corresponding page. The ARC field maintains a count of DMA accesses that were passed through both SDF ports of TOMS 216 to the 32 cache lines within a 2 KB page. The TAG field indicates the address of the page that the entry corresponds to. In one example DMAF 218 supports up to 256 terabytes (TB) of memory space, requiring 48 address bits, with 8 KB indexes (13 bits) and 37-bit page addresses, in which case the TAG is 24 bits.

Driver 131 is responsive to patterns of I/O accesses stored in active page table 148 to selectively move the data to a memory location that is identified by driver 131. Hardware sequencer 134 periodically scans DMAF 214, and in response to scanning DMAF 214 writes selected content from DMAF 214 to active page table 148. Driver 131 runs on host processor 120 and accesses active page table 148 to selectively make data movement decisions based on data in the active page table 148.

In this way DMAF 218 stores information indicating a location of uncacheable data that is stored by extended scalable data fabric 200. Hardware sequencer 134 selectively moves data from DMAF 218 to active page table 148 to make it visible to the operating system and to allow driver 131 to efficiently make page placement decisions, and thereby improve the locality of data regardless of the diversity of the memory resources.

Figure 5:
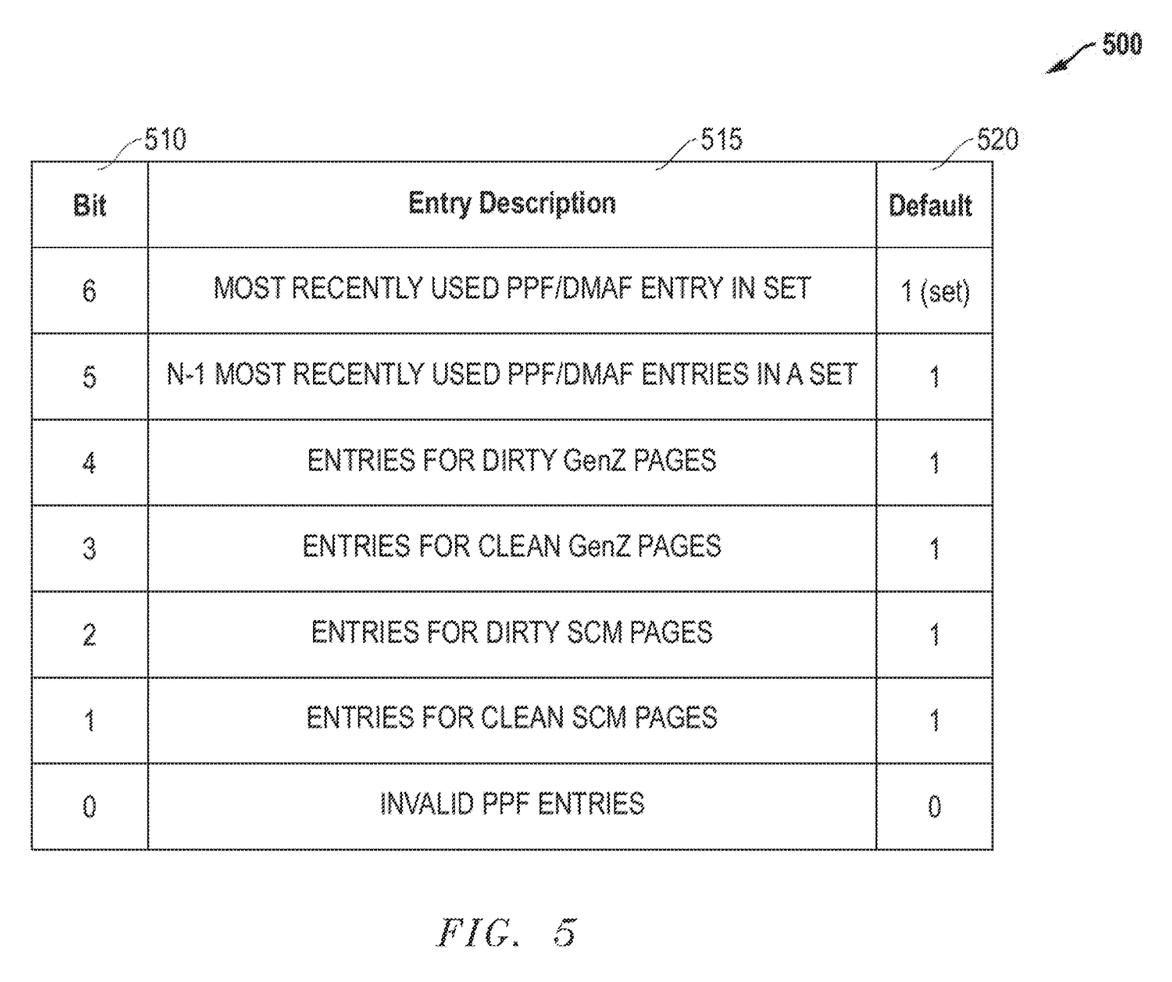
FIG. 5 illustrates a table showing an active page table mask register of the hardware data sequencer of FIG. 1 according to some embodiments.

FIG. 5 illustrates a table 500 showing an active page table mask register of hardware data sequencer 134 of FIG. 1 according to some embodiments. Table 500 includes a first column 510 of bit numbers for seven types of data, a second column 515 listing the seven types of data for the corresponding bit, and a third column 520 listing a default setting for the corresponding bit. Bit 0 indicates the page probe filter entries are invalid, and has a default value of 0 (cleared). Bit 1 selects entries for clean storage class memory (SCM) pages, and has a default value of 1 (set). Bit 2 selects entries for dirty SCM pages, and has a default value of 1. Bit 3 selects entries for clean GenZ pages, and has a default value of 1. Bit 4 selects entries for dirty GenZ pages, and has a default value of 1. Bit 5 selects entries for the N−1 most recently used entries of PPF 214 or DMAF 218 in a set, and has a default value of 1. Bit 6 selects entries for the most recently used PPF 214 or DMAF 218 in a set, and has a default value of 1. Collectively, the mask bits illustrated in table 500 allow driver 131 to select the content to be placed in active page table 148 so that it can make page movement decisions appropriate to its operating environment.

In other embodiments, PPF 214 and DMAF 218 can select which data to track, and hardware sequencer 134 can instead move all tracked data into active page table 148.

Although the present invention has been described with reference to preferred embodiments, those skilled in the art will recognize that changes may be made in form and detail without departing from the scope of the invention. For example, PPF 214 and DMAF 218 can be used individually or together as a combination. Moreover, the exact types and form of information stored by PPF 214 and DMAF 218 may vary between different embodiments. The extended scalable data fabric disclosed herein may be implemented using any suitable protocol, including but not limited to the GenZ protocol.

Some or all of the policies illustrated in FIGS. 3-5 may be governed by instructions that are stored in a computer readable storage medium and that are executed by at least one processor. Each of the operations shown in FIGS. 3-5 may correspond to instructions stored in a non-transitory computer memory or computer readable storage medium. In various embodiments, the non-transitory computer readable storage medium includes a magnetic or optical disk storage device, solid-state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Moreover, integrated circuits used to implement portions of the extended scalable data fabric described above may be described or represented at least in part by a computer accessible data structure in the form of a database or other data structure, which can be read by a program and used, directly or indirectly, to fabricate the integrated circuit that includes an encoder or decoder or system as described herein. For example, this data structure may be a behavioral-level description or register-transfer-level (RTL) description of the hardware functionality in a high-level design language (HDL) such as Verilog or VHDL. The description may be read by a synthesis tool that may synthesize the description to produce a netlist including a list of gates from a synthesis library. The netlist includes a set of gates that also represent the functionality of the hardware including an integrated circuit. The netlist may then be placed and routed to produce a data set describing geometric shapes to be applied to masks. The masks may then be used in various semiconductor fabrication steps to produce an integrated circuit. Alternatively, the database on the computer accessible storage medium may be the netlist (with or without the synthesis library) or the data set, as desired, or Graphic Data System (GDS) II data.

Thus, to the maximum extent allowed by law, the scope of the present invention is to be determined by the broadest permissible interpretation of the following claims and their equivalents, and shall not be restricted or limited by the foregoing detailed description.

What is claimed is:

1. A data processing system, comprising:
a host processor comprising a hardware sequencer;
a local memory coupled to the host processor;
instructions running on the host processor;
a plurality of remote memory media; and
a scalable data fabric coupled to the host processor and to the plurality of remote memory media, wherein the scalable data fabric includes a filter for storing information indicating a location of data that is stored by the data processing system,
wherein the instructions program the hardware sequencer to periodically scan the filter and write selected data to an active page table, and
wherein the instructions access the active page table to migrate selected pages stored in the remote memory media to the local memory.

2. The data processing system of claim 1, wherein:
the instructions comprise a driver running on the host processor for accessing the active page table and selectively making data movement decisions based on data in the active page table.

3. The data processing system of claim 1, wherein the instructions are a module of an operating system.

4. The data processing system of claim 1, wherein the hardware sequencer includes a plurality of control registers to determine which of the selected data to write to the active page table.

5. The data processing system of claim 1, wherein the filter tracks the location of data in the local memory and the plurality of remote memory media and provides, to the hardware sequencer, location information according to a type of data.

6. The data processing system of claim 5, wherein the type of data indicates one of a cache miss and a cache hit.

7. The data processing system of claim 1, wherein the scalable data fabric operates as a coherent slave module that tracks memory locations that are cached anywhere in the data processing system.

8. The data processing system of claim 1, wherein the filter is a page probe filter for storing a list having a plurality of entries associated with coherent accesses, wherein the filter is responsive to patterns of page probes to selectively move the selected data.

9. The data processing system of claim 8, wherein the page probe filter is coupled to a coherent slave module.

10. The data processing system of claim 1, further comprising a remote memory accessing agent for selectively caching data from the plurality of remote memory media.

11. The data processing system of claim 1, further comprising an input/output memory slave, wherein the filter tracks uncacheable remote memory locations that are accessed through the input/output memory slave.

12. A scalable data fabric for use in a data processing system, comprising:
an input/output interface;
a coherent slave module coupled to the input/output interface that implements a cache coherency protocol, the coherent slave module having a first filter that includes a list of all pages which are actively cached in the data processing system, and exposes selected information related to the pages to an external agent through the input/output interface; and
an input output memory slave module coupled to the input/output interface having a second filter that includes a location of uncacheable data stored in the scalable data fabric, and exposes selected information related to the uncacheable data to the external agent through the input/output interface.

13. The scalable data fabric of claim 12, wherein the first filter comprises a page probe filter table that has a plurality of entries each having a field that associates descriptive information with a first type of data, wherein the first type of data is a coherent data.

14. The scalable data fabric of claim 12, wherein the first filter includes a sector valid entry field that indicates a validity of a corresponding cache line.

15. The scalable data fabric of claim 12, wherein the first filter includes a remote socket valid entry field and a local socket valid entry field for indicating a locality of a cache line in a local or a remote memory accessing agent.

16. The scalable data fabric of claim 12, wherein the first filter includes a state entry field that tracks a plurality of states including validity, exclusivity, and write status of the selected information.

17. The scalable data fabric of claim 12, wherein the first filter includes an aggregate reference count entry field that tracks a count of cached copies of the selected information received at the coherent slave module.

18. The scalable data fabric of claim 12, wherein the first filter includes an address entry field for identifying a page address and a tag of the selected information.

19. The scalable data fabric of claim 12, wherein the second filter receives entries to a plurality of entry fields that catalog the selected information.

20. The scalable data fabric of claim 12, wherein the second filter includes a sector valid entry field for tracking direct memory access request for the selected information.

21. The scalable data fabric of claim 12, wherein the second filter includes a request/respond entry field that identifies a requesting compute device.

22. The scalable data fabric of claim 12, wherein the second filter includes a dirty entry field for identifying when at least one write is issued to the selected information.

23. The scalable data fabric of claim 12, wherein the second filter includes an aggregate reference count entry field that tracks a count of direct memory accesses that pass through the input output memory slave module to a respective page.

24. The scalable data fabric of claim 12, wherein the second filter includes an address entry field for identifying a page address and a tag of the selected information.

25. A method for moving data in a data processing system having a processor with a local memory coupled to the processor, and a scalable data fabric coupled to a remote medium, comprising:
tracking memory accesses in the data processing system, the tracking including storing information indicating a location of data stored in the data processing system in a page probe filter of the scalable data fabric;
periodically scanning the page probe filter;
writing a selection of content from the page probe filter to an active page table stored in the local memory; and
accessing the active page table and selectively making a page migration decision to move a page from the remote medium to the local memory in response to the accessing.

26. The method of claim 25, wherein selectively making the page migration decision comprises:
making the page migration decision if the page is most frequently accessed by the processor and is stored in the remote medium.

27. The method of claim 25, wherein selectively making the page migration decision comprises:
making the page migration decision if the page is being accessed by the processor and is stored in the remote medium.

28. The method of claim 25, further comprising:
using a system call to migrate the page from the remote medium to the local memory.

* * * * *